Aug. 7, 1945.　　　　　G. A. DUNN　　　　　2,380,954
PEAR PEELER STEMMING TUBE BRAKE ASSEMBLY
Original Filed Sept. 9, 1940　　2 Sheets-Sheet 1
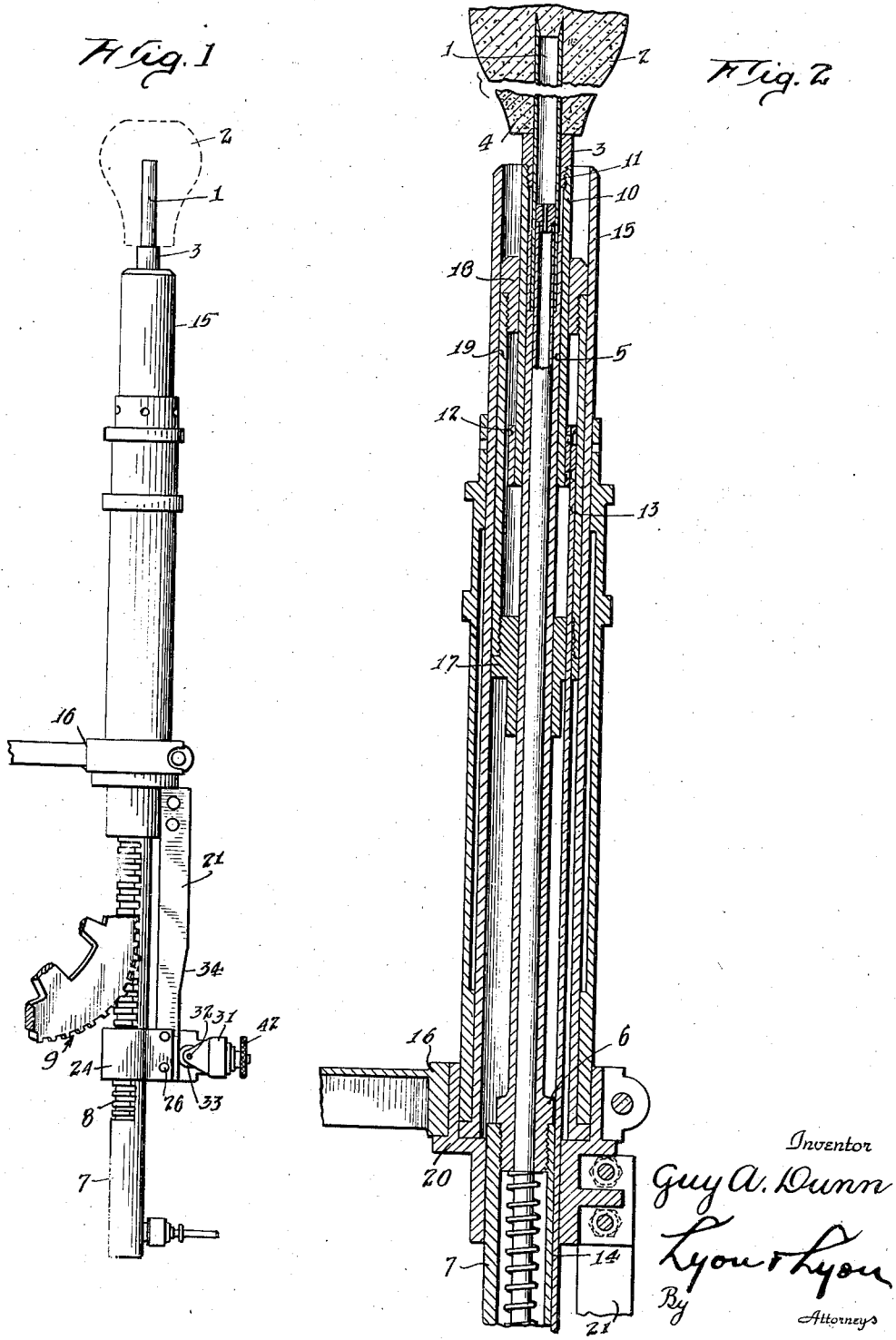
Inventor
Guy A. Dunn
By Lyon & Lyon
Attorneys Aug. 7, 1945.　　　　G. A. DUNN　　　　2,380,954
PEAR PEELER STEMMING TUBE BRAKE ASSEMBLY
Original Filed Sept. 9, 1940　　2 Sheets-Sheet 2

Inventor
Guy A. Dunn
By Lyon & Lyon
Attorneys

Patented Aug. 7, 1945

2,380,954

UNITED STATES PATENT OFFICE 2,380,954

PEAR PEELER STEMMING TUBE BRAKE ASSEMBLY

Guy A. Dunn, Oakland, Calif., assignor to California Packing Corporation, San Francisco, Calif., a corporation of New York Original application September 9, 1940, Serial No. 355,988. Divided and this application July 24, 1943, Serial No. 496,083

6 Claims. (Cl. 146—52)

This invention relates to a pear preparation machine stemming tube brake assembly, and more particularly to a brake assembly applicable for use in maintaining the desired position of a stemming or impaling tube in a pear preparation machine.

This application is a division of my copending application, Serial No. 355,988, filed September 9, 1940, for Pear peeling machine.

It is an object of this invention to provide a brake or holding means for maintaining the correct relative positions of a stemming tube and holding collar with relation to the length of a pear supported upon the stemming tube or impaling member.

Another object of this invention is to provide a brake for a stemming tube assembly, which assembly includes a stemming tube and an end supporting element for a fruit impaled upon the stemming tube wherein there is relative movement of the end support and stemming tube, which brake includes a brake member connected with the end support and a friction means adapted to engage the brake member to hold the end supporting member in fixed position relative to the stemming tube.

Another object of this invention is to provide a brake assembly applicable for use in a pear preparation machine for maintaining relative positions of an end support and impaling member, which brake assembly includes a brake member connected with one of said movable elements and which is adapted to be engaged or disengaged in accordance with the movement of the other of said members and which is controlled by a cam means operably connected with and actuated by the movement of the impaling member.

Other objects and advantages of this invention it is believed will be apparent from the following detailed description of a preferred embodiment thereof as illustrated in the accompanying drawings.

In the drawings:

Figure 1 is an elevation of the stemming tube and brake assembly embodying my invention.

Figure 2 is a sectional elevation of the upper portion of said assembly.

Figure 3:
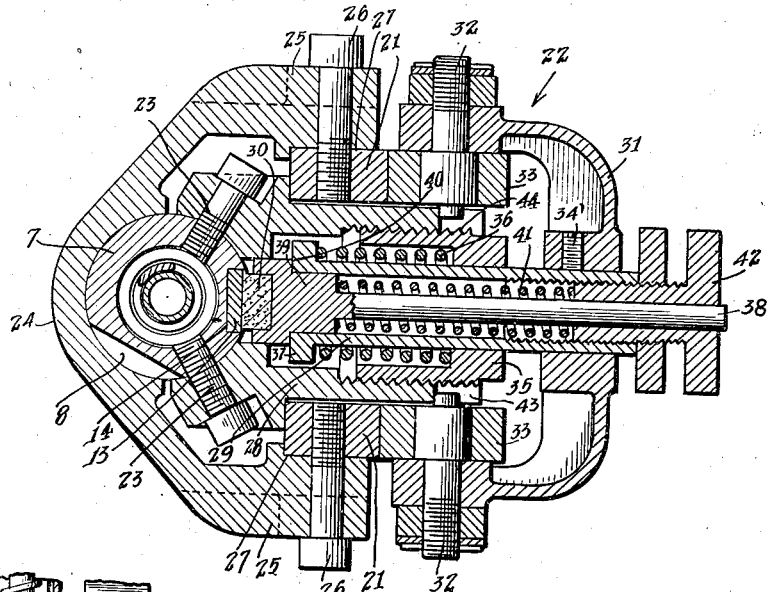
Figure 3 is a sectional view of the lower portion of said assembly.
Figure 4:
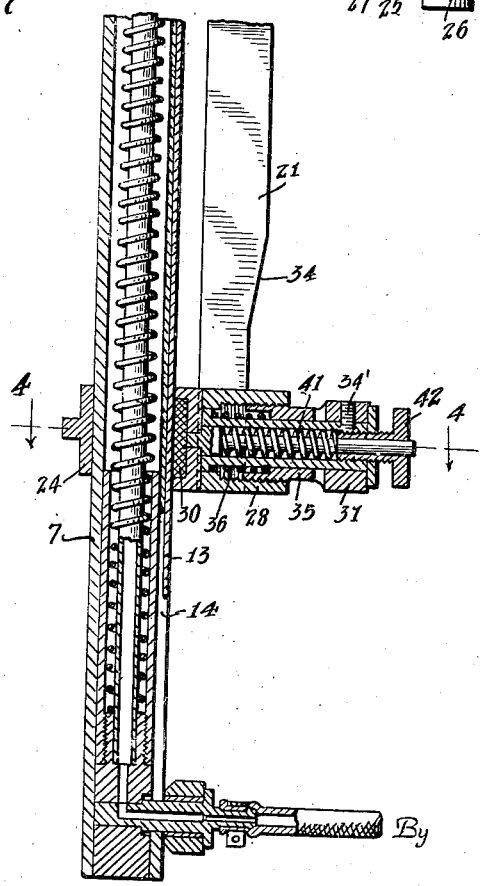
Figure 4 is a sectional plan view taken substantially on the line 4—4 of Figure 3.

The stemming tube and brake assembly embodying my invention includes a stemming tube 1 which is adapted to be impaled along the stem axis of a pear 2. Any suitable or desirable means may be employed for holding the pear 2 during such impaling operation, one form of which means is believed to be apparent from my said copending application.

Positioned with relation to the stemming tube 1 is an end support or collar 3 which has relative movement axially with relation to the stemming tube 1 and provides an end support for the end 4 of the pear 2 so as to determine the position of the pear as impaled upon or by the stemming tube 1.

The stemming tube assembly as herein illustrated is composed of the stemming tube 1 which is secured to the upper end of an actuating tube 5. The actuating tube 5 is in turn secured by means of a connecting collar 6 to a rack tube 7. The rack tube 7 has formed thereon a rack 8 adapted to mesh with the gear segment indicated at 9. The gear segment 9 is actuated through any suitable means for moving the stemming tube. The stemming tube is moved to impale the same along the stem axis of the pear 2. As the pear is impaled with the stemming tube 1, the collar 3 is positioned upon the stemming tube assembly so that it may move with reference to the stemming tube 1 so that it will engage the lower end 4 of the pear 2 to support the pear against endwise motion. After the collar 3 has engaged the end 4 of the pear 2 and is thus positioned to support the pear, means are provided for locking the collar in its position of support.

The collar 3 is supported on a sleeve 10 which surrounds the stemming tube 1 and the upper portion of the supporting tube 5. The sleeve 10 is secured to the collar 3 by any suitable means such as through the means of the threads 11.

At the lower end of the sleeve 10 there is secured a collar 12 to which there is secured a brake ribbon 13. The brake ribbon 13 extends downwardly along the supporting tube 5 and within a groove 14 formed in the periphery of the rack tube 7.

In order to support the stemming tube assembly and to guide the elements during their vertical movement, they are mounted within a housing tube 15 by means of which the assembly is supported within the split boss carried at the end of the supporting arm 16. Positioned within the housing tube 15 is a guide assembly consisting of a pair of spaced collars 17 and 18 connected through the medium of a connecting tube 19 providing guide bearing surfaces engaging the inner surface of the housing tube 15. The housing tube 15 is carried within a connecting collar 20 which is supported within the clamp boss of the supporting arm 16. The collar 20 provides a guide for the upper end of the rack tube 7.

Secured to the collar 20 at its upper end are spaced cam bars 21 which extend downwardly along the rack tube 7. Brake means are provided which are actuated by the cam bar 21 in accordance with the movement of the rack tube 7 and which brake means as herein illustrated includes a brake body 22 which is secured to the rack tube 7 by means of cap screws 23.

Passed around the rack tube 7 is a stirrup 24, the two parallel arms 25 of which are secured by means of pins 26 to the cam bars 21. The cam bars 21 are seated on shoulders 27 formed on the stirrup arms 25 to position the same a definite distance from the brake strip 13.

The brake body 22 provides a cylinder 28 within which there is mounted a brake plunger 29 which carries a brake shoe 30 to frictionally engage the surface of the brake ribbon 13. Means are provided for actuating the plunger 29 to and from braking position, which means as herein illustrated includes the yoke 31. The arms carry on pins 32 cam rollers 33 adapted to engage the cam surfaces 34 of the cam bar 21. The yoke 31 is secured to the plunger 29 by means of a set screw or screws 34'.

Secured to the end of the cylinder 28 is a cap 35 through which the plunger 29 extends and which cap provides a surface against which the compression spring 36 is seated. The spring 36 is seated at its opposite end against the flange 37 formed at the end of the plunger 29. The spring 36 thus normally exerts pressure tending to force the brake shoe 30 toward the brake ribbon 13.

Mounted within the plunger 29 and carrying the brake shoe 30 is a carrier rod 38, the inner end of which is formed to provide a head 39 which is slidably mounted within the inner bore of the plunger 29. This head 39 is provided with an annular shoulder 40 against which the end of the plunger 29 is urged by the spring 36. The carrier rod 38 is yieldably urged lengthwise of the plunger 29 by means of a compression spring 41 which is seated at its inner end against the head 39 and at its outer end against the end of the plug 42.

In order to guide the yoke 31 and plunger 29 in movement as actuated by the cam bars 21, the inner ends of the cam roller supporting pins 32 extend into slots 43 formed in the end of the cylinder 28. By adjustment of the position of the cap 35 within cylinder 28 along the threads 44, the force exerted by the spring 36 may be regulated. Similarly the force exerted by the spring 41 against the plunger head 39 may be adjusted by the threading of the plug 42 into the plunger 29.

The arrangement of the brake is such as to impart a braking force against the brake ribbon 13 sufficient to hold the collar 3 against the end of the pear 2 after the pear has been impaled in the stemming tube 1 independent of the movement of the stemming tube assembly under the influence of the gear segment 9 as long as such movement does not result in the movement of the cam bar against the rollers 33 so that the cam surface 34 thereof acts to release the brake thus provided.

The provision of the auxiliary braking performed through the medium of the relatively weak spring 41 acting against the carrier rod 38 is such as to maintain a slight friction against the brake ribbon 13 so as to prevent the free floating of the collar 3 when the braking force is dissipated by the retraction of the plunger 29 under the influence of the cam rollers 33. This provision of the auxiliary braking means to provide a slight friction is for the purpose of holding the collar 3 along the stemming tube 1 until it is caused to move therealong by engagement with the end of the pear 2, thus insuring that when the collar 3 is finally locked or effectively braked from movement along the stemming tube 1, it will be in a position of firm engagement with the pear 2. Without such auxiliary braking means and with the primary braking means released as provided through the plunger 29, there would be nothing to prevent the collar 3 from freely floating on the stemming tube 1 and moving to a position away from the end 4 of the pear 2 where it would later be locked.

Having fully described my invention, it is to be understood that I do not wish to be limited to the details herein set forth, but my invention is of the full scope of the appended claims.

I claim:

1. A friction release assembly for use with a pear preparing machine, comprising a body member fixedly secured to a stemming tube assembly, a brake shoe disposed within said body, resilient means disposed within said body arranged to press said brake shoe against a ribbon slidably disposed in a suitable groove in said stemming tube assembly, whereby said ribbon is locked to said assembly, and means for releasing said ribbon relative to said assembly, comprising a camming surface disposed parallel to said stemming tube, a yoke, a roller engaging said surface, said roller being pivotally mounted on said yoke, and adjustable means linking said shoe and said yoke for withdrawing said brake shoe from engagement with said ribbon, said adjustable means being normally resiliently held in engagement therewith.

2. A friction release unit for use with a stemming tube assembly having a slidable ribbon therein, comprising a body member having a bore therein disposed normally to said assembly, a sleeve within said bore, a helical spring disposed within said sleeve, a tubular-shafted piston disposed within said bore and resiliently engaged by said spring, a brake block-bearing member slidably disposed within said piston, resilient means disposed about said brake block-bearing member for urging it toward said stemming tube, a brake block mounted in said member and arranged to engage said slidable ribbon member in said stemming tube assembly, a threaded adjusting nut arranged to control tension in said spring, a lock nut to fix the tension at a desired value, a yoke fixed to said tubular piston, rollers rotatably mounted on said yoke, parallel camming members disposed parallel to the axis of said stemming tube and arranged to slide between said body member and said rollers, each of said camming members having a surface projecting outwardly to cause said rollers to retract said piston against the pressure of said resilient helical spring to release the pressure of said brake block against said ribbon.

3. In a brake for a stemming tube assembly including a stemming tube, an end collar adjustable along the stemming tube, means for moving the stemming tube to impale a pear along its stem axis, a brake member connected with the collar, a friction means for engaging the brake member, and means for causing the friction means to engage the brake member to hold the collar in fixed position relative to the stemming tube.

4. In a brake for a stemming tube assembly, including a stemming tube, an end collar adjustable along the stemming tube, means for moving the stemming tube to impale a pear along its stem axis, and brake means adapted to hold the collar from movement along the stemming tube, said brake means including a brake member connected with the collar, a friction means for engaging the brake member, means for actuating the friction means to and from brake-member engaging position, and means operable independently of the brake actuating means for maintaining friction against the brake member to hold the collar from free floating along the stemming tube.

5. In a brake for a stemming tube assembly, the combination of an axially movable stemming tube, a tubular guide therefor, relatively stationary means for supporting the tubular guide, a brake element secured to the stemming tube within the guide, a friction element, means supporting the friction element in operative relation to the brake element in position exterior to the stemming tube, and means operatively connected to the stationary supporting means for actuating the friction element away from the brake element upon movement of the stemming tube within the guide.

6. In a brake for a stemming tube assembly including a stemming tube, means for moving the stemming tube to impale a pear, a stop element operatively associated with the stemming tube to engage the pear, brake means adapted to hold the stop element from movement with relation to the stemming tube, said brake means including a brake member connected with the stop element, a friction means for engaging the brake member, means for actuating the friction means to and from brake member engaging position, and means operable independently of the brake actuating means for maintaining a friction against the brake member to hold the stop element from free movement with relation to the stemming tube.

GUY A. DUNN.